(12) United States Patent
Ueda et al.

(10) Patent No.: US 11,661,278 B2
(45) Date of Patent: May 30, 2023

(54) WAREHOUSING/SHIPPING-OPERATION SUPPORT SYSTEM, WAREHOUSING/SHIPPING-OPERATION SUPPORT METHOD, AND NONTRANSITORY COMPUTER-READABLE MEDIUM

(71) Applicant: SATO HOLDINGS KABUSHIKI KAISHA, Tokyo (JP)

(72) Inventors: Yoshiyuki Ueda, Tokyo (JP); Haruna Tajima, Tokyo (JP)

(73) Assignee: SATO HOLDINGS KABUSHIKI KAISHA, Tokyo (JP)

( * ) Notice: Subject to any disclaimer, the term of this patent is extended or adjusted under 35 U.S.C. 154(b) by 199 days.

(21) Appl. No.: 16/074,641

(22) PCT Filed: May 26, 2017

(86) PCT No.: PCT/JP2017/019759
§ 371 (c)(1),
(2) Date: Aug. 1, 2018

(87) PCT Pub. No.: WO2018/047418
PCT Pub. Date: Mar. 15, 2018

(65) Prior Publication Data
US 2019/0039828 A1     Feb. 7, 2019

(30) Foreign Application Priority Data

Sep. 12, 2016  (JP) .............................. JP2016-177880

(51) Int. Cl.
*G06Q 20/20*    (2012.01)
*G01C 21/36*    (2006.01)
(Continued)

(52) U.S. Cl.
CPC ............. *B65G 1/1373* (2013.01); *B65G 1/10* (2013.01); *B65G 1/137* (2013.01); *G06Q 10/08* (2013.01);
(Continued)

(58) Field of Classification Search
CPC ........ B65G 1/1373; B65G 1/10; B65G 1/137; G06Q 10/08; G06Q 10/083
See application file for complete search history.

(56) References Cited

U.S. PATENT DOCUMENTS 8,423,431 B1 *  4/2013  Rouaix ................ B65G 1/1373
                                                            705/28

FOREIGN PATENT DOCUMENTS

JP    2010-18411 A       1/2010
JP    2010018411 A  *    1/2010

OTHER PUBLICATIONS

Extended European Search Report, dated Jan. 31, 2019, 7 pages.

* cited by examiner

*Primary Examiner* — Nathan C Uber
*Assistant Examiner* — Matthew S Weronski
(74) *Attorney, Agent, or Firm* — Foley & Lardner LLP

(57) ABSTRACT

A warehousing/shipping-operation support system selects, for a first article in a warehousing/shipping operation, by using acquired positional information of an operator, a sign closer to a position of the operator among signs in the vicinity of a storage location of the article, and the warehousing/shipping-operation support system selects, for a second and following articles, by using the storage-location information of the article whose warehousing/shipping has been completed as the positional information of the operator, a sign closer to the position of the operator among the signs in the vicinity of the storage location of the article.

14 Claims, 12 Drawing Sheets

(51) Int. Cl.
*G01C 21/34* (2006.01)
*B65G 1/137* (2006.01)
*G06Q 10/08* (2023.01)
*B65G 1/10* (2006.01)
*G06Q 10/083* (2023.01)

(52) U.S. Cl.
CPC ....... *G06Q 10/083* (2013.01); *B65G 2209/04* (2013.01)

FIG.7

| ARTICLE NAME | THE ARTICLE ID | STORAGE-LOCATION INFORMATION |
|---|---|---|
| AAA | 000000111 | 101-XX-ZZZ |
| BBB | 000001234 | 201-YY-YYY |
| CCC | 000002345 | 110-XX-SSS |
| DDD | 000003456 | 211-AA-BBB |
| EEE | 000004567 | 111-ZZ-YYY |
| ... | ... | ... |
| ... | ... | ... |
| ... | ... | ... |

FIG. 9

| ARTICLE NAME | ARTICLE ID | STORAGE-LOCATION INFORMATION | OPERATOR TERMINAL POSITIONAL INFORMATION | SIGN | DIRECTION |
|---|---|---|---|---|---|
| SET OF FOUR HANGERS | 12345670111 | 001-XX-ZZZ | START | B-3 | GO FORWARD |
| STORAGE BOX L | 12345670222 | 003-XX-YYY | 001-XX-ZZZ | D-3 | RIGHT |
| SPATULA | 12345670333 | 005-XX-CCC | 003-XX-YYY | D-1 | RIGHT |
| SET OF THIRTY TRASH BAGS (L SIZE) | 12345670444 | 110-XX-BBB | 005-XX-CCC | C-1 | LEFT |
| BLUE PRINTER INK | 12345670555 | 101-XX-YYY | 110-XX-BBB | ... | ... |
| ... | ... | ... | 101-XX-YYY | ... | ... |
| | | | ... | ... | ... |

| ORDER | ARTICLE NAME | ARTICLE ID | SIGN | DIRECTION |
|---|---|---|---|---|
| 1 | SET OF FOUR HANGERS | 12345670111 | B-3 | GO FORWARD |
| 2 | STORAGE BOX L | 12345670222 | D-3 | RIGHT |
| 3 | SPATULA | 12345670333 | D-1 | RIGHT |
| 4 | SET OF THIRTY TRASH BAGS (L SIZE) | 12345670444 | C-1 | LEFT |
| 5 | ... | ... | ... | ... |

WAREHOUSING/SHIPPING-OPERATION SUPPORT SYSTEM, WAREHOUSING/SHIPPING-OPERATION SUPPORT METHOD, AND NONTRANSITORY COMPUTER-READABLE MEDIUM

TECHNICAL FIELD

The present invention relates to a warehousing/shipping-operation support system that supports a warehousing/shipping operation for warehousing/shipping a predetermined article to/from a storage area.

BACKGROUND ART

In the field of logistics, due to with the recent increase in logistics speed, there is a demand for improving efficiencies in storing, warehousing, and shipping operations of articles. In order to satisfy the demand, a system that supports an operator W performing warehousing/shipping operation of the articles has been proposed (see JP2010-018411 A).

In the warehousing/shipping-operation support system disclosed in JP2010-018411A, communication devices are respectively provided on parts racks and parts boxes that are storage spaces for storing the articles. In addition, the operator carries a mobile device capable of communicating with the communication devices.

In this system, positional information of the operator is calculated through wireless communication between the communication devices and the mobile device. Furthermore, the shortest path from the positional information of the operator to the article is also calculated. Thus obtained shortest path is displayed on the mobile device of the operator. On the other hand, the communication device provided on each of the parts boxes shows an indication such that the operator can easily recognize the storage space of the target article.

With such a configuration, with the warehousing/shipping-operation support system disclosed in JP2010-018411A, the operator can perform the warehousing and shipping operation of the articles efficiently.

SUMMARY OF INVENTION

With the warehousing/shipping-operation support system disclosed in JP2010-018411A, in order to calculate the positional information of the present position of the mobile device carried by the operator, the communication device capable of communicating with the mobile device needs to be provided on each of the parts rack and the parts boxes for storing the articles. Therefore, a wireless communication environment constructed between the mobile devices, the respective communication devices, and so forth becomes complex.

Furthermore, as the size of the area storing the articles is increased, the number of the communication devices to be provided is increased. As the system becomes complex in this way, an installation cost is increased. In addition, because a risk of occurrence of malfunction of the communication devices, communication problems, and so forth is increased, the complexity of the system management also increases. Therefore, it has been desired to construct a more simple system.

An object of the present invention is to suppress the complexity of a system management while avoiding deterioration of efficiency of warehousing/shipping operation and preventing a wireless communication environment from becoming complex.

According to an aspect of the present invention, a warehousing/shipping-operation support system for warehousing a plurality of articles to a storage area or shipping the plurality of articles from the storage area is provided. The warehousing/shipping-operation support system comprises: a map-information saving unit configured such that map information of the storage area and positional information of a plurality of signs set in the storage area are saved in the map-information saving unit; a storage-location information saving unit configured such that storage-location information indicating a storage location of each of the articles in the storage area are saved in the storage-location information saving unit; a positional information acquisition unit configured to acquire positional information of a start position of an operator in a warehousing/shipping operation; and a processing unit configured to select, based on storage-location information of a specific article among the plurality of articles and the positional information of the operator, a sign positioned on the operator side among the signs in a vicinity of a storage location of the article from the plurality of signs, wherein the processing unit selects, for a first article at a time of the warehousing/shipping operation, a sign positioned on the operator side among the signs in a vicinity of a storage location of the first article by using the positional information of the operator acquired by the positional information acquisition unit, and the processing unit selects, for a next article at the time of the warehousing/shipping operation, a sign positioned on the operator side among the signs in a vicinity of the storage location of the next article by using the storage location information of a preceding article as the positional information of the operator.

According to the above-mentioned aspect, it is possible to suppress the complexity of the system management while avoiding deterioration of efficiency of the warehousing/shipping operation and preventing the wireless communication environment from becoming complex.

BRIEF DESCRIPTION OF DRAWINGS

FIG. 7 is a diagram for explaining a table saved in a storage-location-information saving region in the warehousing/shipping-operation support system.

FIG. 9 is a diagram for explaining operation information, such as the sign selected by the processing unit of the support device in the warehousing/shipping-operation support system, a shortest path to the selected sign, a direction from the sign, and so forth.

DESCRIPTION OF EMBODIMENTS

[Warehousing/Shipping-Operation Support System]

A warehousing/shipping-operation support system according to an embodiment of the present invention is the warehousing/shipping-operation support system for warehousing a plurality of articles to a storage area or shipping the plurality of articles from the storage area and comprises: a map-information saving unit configured such that map information of the storage area and positional information of a plurality of signs set in the storage area are saved in the map-information saving unit; a storage-location information saving unit configured such that storage-location information indicating a storage location of each of the articles in the storage area are saved in the storage-location information saving unit; a positional information acquisition unit configured to acquire positional information of a start position of an operator in a warehousing/shipping operation; and a processing unit configured to select, based on storage-location information of a specific article among the plurality of articles and the positional information of the operator, a sign positioned on the operator side among the signs in a vicinity of a storage location of the article from the plurality of signs.

With the warehousing/shipping-operation support system, the processing unit selects, for a first article at a time of the warehousing/shipping operation, a sign positioned on the operator side among the signs in the vicinity of a storage location of the first article by using the positional information of the operator acquired by the positional information acquisition unit. In addition, the processing unit selects, for a next article at the time of the warehousing/shipping operation, a sign positioned on the operator side among the signs in the vicinity of the storage location of the next article by using the storage location information of the preceding article as the positional information of the operator.

Figure 1:
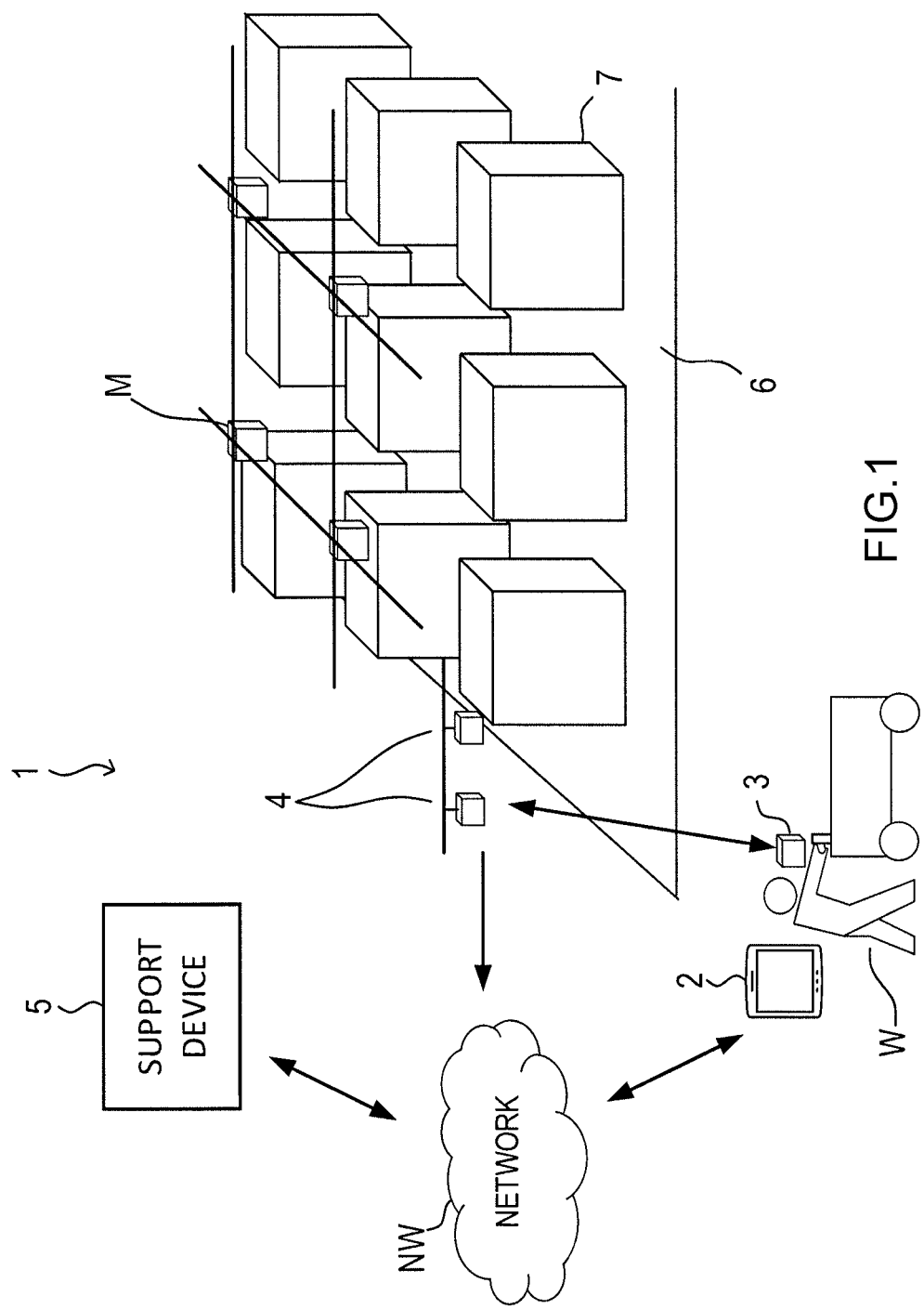
FIG. 1 is a schematic view for explaining a warehousing/shipping-operation support system according to an embodiment of the present invention.

A warehousing/shipping-operation support system 1 according to the embodiment of the present invention will be described below in detail with reference to the drawings. FIG. 1 is a schematic view for explaining the warehousing/shipping-operation support system 1 according to this embodiment.

The warehousing/shipping-operation support system 1 has a communication terminal 2 used by an operator W (that corresponds to an operator communication terminal), a communication instrument 3 that is carried by the operator W and that detects positional information of the operator W, communication-instrument detection devices 4 that detect the communication instrument 3, and a support device 5 that executes various processes for supporting a warehousing/shipping operation.

In addition, in the warehousing/shipping-operation support system 1, at least the communication terminal 2, the support device 5, and the communication-instrument detection devices 4 are connected via a network NW so as to be able to communicate with each other.

With the warehousing/shipping-operation support system 1, in order to allow the operator W to reach target articles to be warehoused/shipped more easily during the warehousing/shipping operation in which the articles are warehoused/shipped to/from a storage area 6, the nearest signs to the articles are notified to the communication terminal 2 carried by the operator W.

Here, the storage area 6 is a warehouse, for example. A plurality of racks 7 for storing the articles are provided in the storage area 6. In addition, signs M are provided at predetermined positions in the storage area 6. In the storage area 6, a plurality of operation aisles through which the operator W moves are formed so as to intersect with each other. In this embodiment, in the storage area 6, the operation aisles are formed to have a grid shape.

With the warehousing/shipping-operation support system 1, a start position (hereinafter, it may also by expressed as an access gate) in the warehousing/shipping operation in the storage area 6 is specified.

In addition, in this embodiment, the signs M are respectively provided at intersections of the aisles formed between the racks 7. In addition, the signs M are respectively provided at ceiling portions of the intersections so as to be easily visible from the operator W and so as not to disturb the warehousing/shipping operation.

<Communication Terminal>

Figure 2:
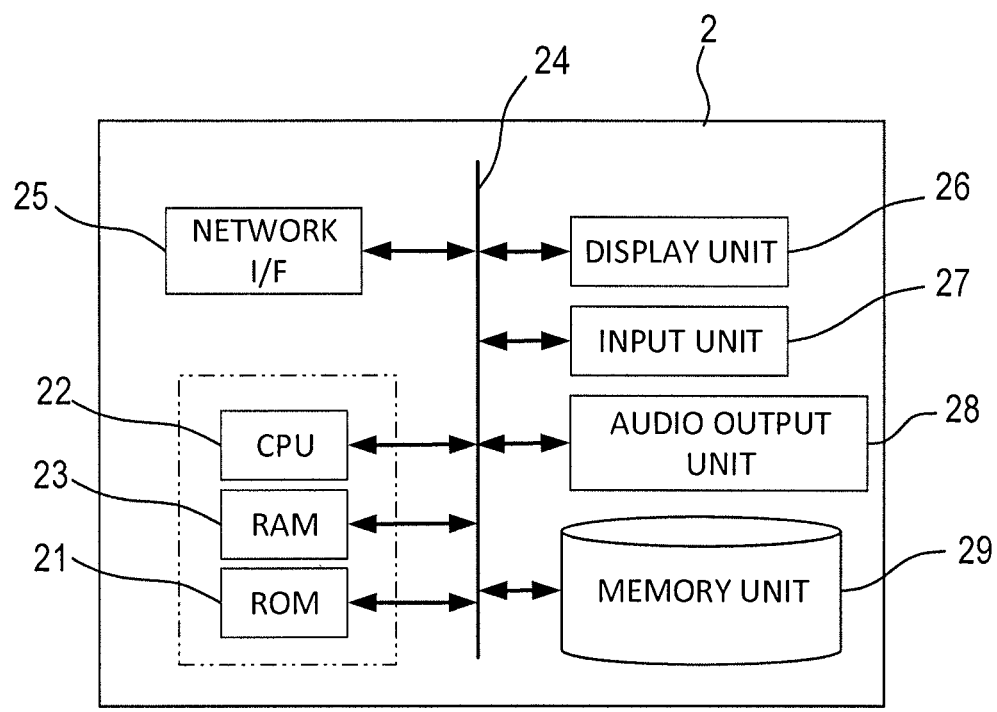
FIG. 2 is a block diagram for explaining a communication terminal in the warehousing/shipping-operation support system according to this embodiment.

The communication terminal 2 will be described first. FIG. 2 is a block diagram for explaining the communication terminal 2 in the warehousing/shipping-operation support system 1 according to this embodiment.

The communication terminal 2 is a tablet computer in this embodiment. The communication terminal 2 includes a ROM (Read Only Memory) 21, a CPU (Central Processing Unit) 22 that controls each unit in accordance with various control programs stored in the ROM 21, and a RAM (Random Access Memory) 23 as a work area of the CPU 22.

The ROM 21, the CPU 22, the RAM 23, and each component, which will be described later, are connected by an internal bus 24.

In addition, the ROM 21, the CPU 22, and the RAM 23 function as a processing unit that performs a process, which will be described later. This process is performed to present a map of whole storage area 6 and operation information, such as the signs M for guiding the operator W to the target articles of the warehousing/shipping operation, paths to the signs M, and so forth.

In addition, the communication terminal 2 includes a network interface (hereinafter, referred to as a network I/F) 25 so as to be connected to the network NW wirelessly.

In addition, the communication terminal 2 has a display unit 26, an input unit 27, and an audio output unit 28.

The display unit 26 is, for example, a liquid crystal display (LCD) and displays, by a LCD drive that starts up the LCD, the operation information that has been transmitted from the support device 5, which will be described later.

In this embodiment, the input unit 27 is a touch panel that is formed by combining the display unit 26 and a contact detection sensor for a display region of the display unit 26. The input unit 27 receives operation by the operator W, such as inputs for completion of the warehousing/shipping operation, inputs for selection of the target article, and so forth.

The audio output unit 28 (not shown) has a speaker and a circuit that converts digital data to sound. On the basis of the operation information that has been transmitted from the support device 5, the audio output unit 28 outputs, as sound, the operation information, such as the signs M as guides to the target article, the paths to the signs M, and so forth.

In addition, the communication terminal 2 includes a memory unit 29. The operation information that has been transmitted from the support device 5 is saved in the memory unit 29. In other words, the memory unit 29 functions as an operation information saving unit. As the memory unit 29, HDD (Hard Disk Drive), SSD (Solid State Drive), and so forth can be used.

In addition, in the memory unit 29, a program that executes a process for displaying the operation information transmitted from the support device 5 on the display unit 26 may be stored.

Because the communication terminal 2 has the configuration described above, the communication terminal 2 receives the operation information related to the target articles of the warehousing/shipping operation from the support device 5 via the network I/F 25, displays the operation information on the display unit 26, and outputs the sound from the audio output unit 28.

<Communication Instrument>

Next, the communication instrument 3 will be described. The communication instrument 3 is carried by the operator W, and in this embodiment, the communication instrument 3 is a short distance communication instrument conforming to UWB (Ultra Wide Band) mode.

The communication instrument 3 can perform the communication with the communication-instrument detection devices 4 conforming to the UWB mode in the same manner, which will be described later. The communication instrument 3 receives pulse signals transmitted from the communication-instrument detection devices 4 provided at specific positions in the storage area 6. In addition, the communication instrument 3 transmits response signals to the communication-instrument detection devices 4 correspondingly to the received pulse signals.

<Communication-Instrument Detection Device>

Figure 3:
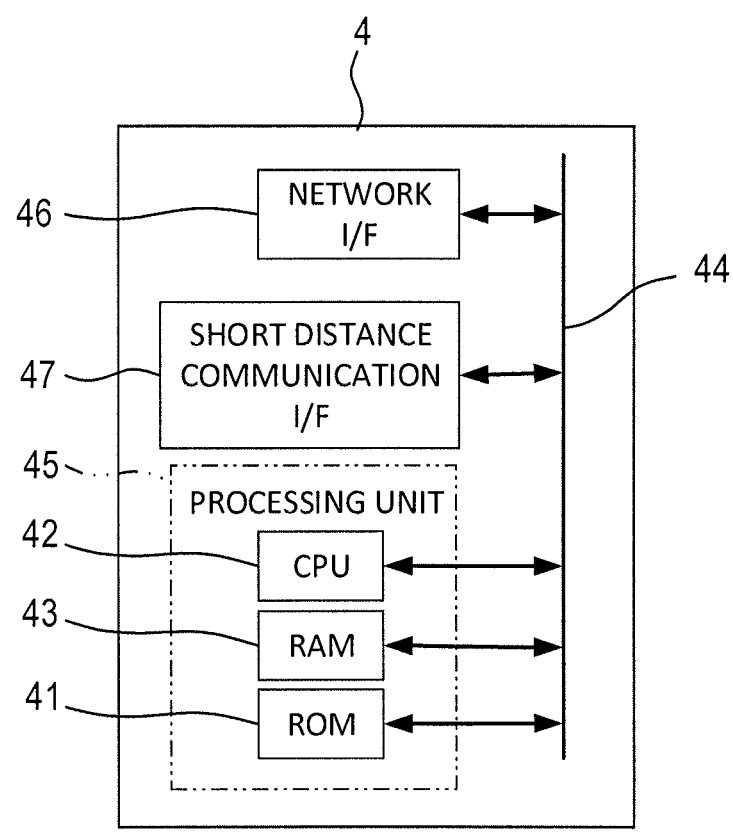
FIG. 3 is a block diagram for explaining a communication-instrument detection device in the warehousing/shipping-operation support system according to this embodiment.

Next, the communication-instrument detection devices 4 will be described. FIG. 3 is a block diagram for explaining the communication-instrument detection devices 4 in the warehousing/shipping-operation support system 1 according to this embodiment.

Each of the communication-instrument detection devices 4 includes a ROM 41, a CPU 42 that controls each unit in accordance with various control programs stored in stored in the ROM 41, and a RAM 43 as a work area of the CPU 42. The ROM 41, the CPU 42, the RAM 43, and each component, which will be described later, are connected by an internal bus 44.

The ROM 41, the CPU 42, and the RAM 43 function as a processing unit 45 that executes a process for detecting positional information of the communication instrument 3.

In addition, each of the communication-instrument detection devices 4 includes a network I/F 46 so as to be connected to the network NW wirelessly.

In addition, each of the communication-instrument detection devices 4 has a short distance communication interface 47 conforming to the UWB mode and can perform communication with the communication instrument 3 conforming to the UWB mode in the same manner. The communication-instrument detection devices 4 transmit the pulse signals continuously. In addition, the communication-instrument detection devices 4 wait for the response signals from the communication instrument 3 that has received the pulse signals.

According to the warehousing/shipping-operation support system 1, the distance between the communication instrument 3 and the communication-instrument detection devices 4 can be calculated on the basis of the time required for the communication instrument 3 to receive the pulse signals transmitted by the communication-instrument detection device 4 provided at a specific position in the storage area 6 and to respond to the communication-instrument detection devices 4.

Therefore, with at least two communication-instrument detection devices 4 whose positional information in the map including the storage area 6 is known in advance, it is possible to locate the position of the communication instrument 3 in the map including the storage area 6 by using triangulation method.

The communication-instrument detection device 4 for detecting the communication instrument 3 carried by the operator W is provided in the vicinity of a start position. By doing so, it is possible to detect with the communication-instrument detection device 4 that the communication instrument 3, in other words, the operator W carrying the communication instrument 3 has reached the start position for the warehousing/shipping operation in the storage area 6.

In this embodiment, it suffices to obtain the positional information of the communication terminal 2 at the time of starting the warehousing/shipping operation. Therefore, the communication-instrument detection device 4 is provided in the vicinity of the start position for the warehousing/shipping operation in the storage area 6.

In other words, by being used together with the communication instrument 3, the communication-instrument detection devices 4 function as a positional information acquisition unit that acquires the positional information of the communication terminal 2 carried by the operator W at the start position for the warehousing/shipping operation in the storage area 6.

<Support Device>

Figure 4:
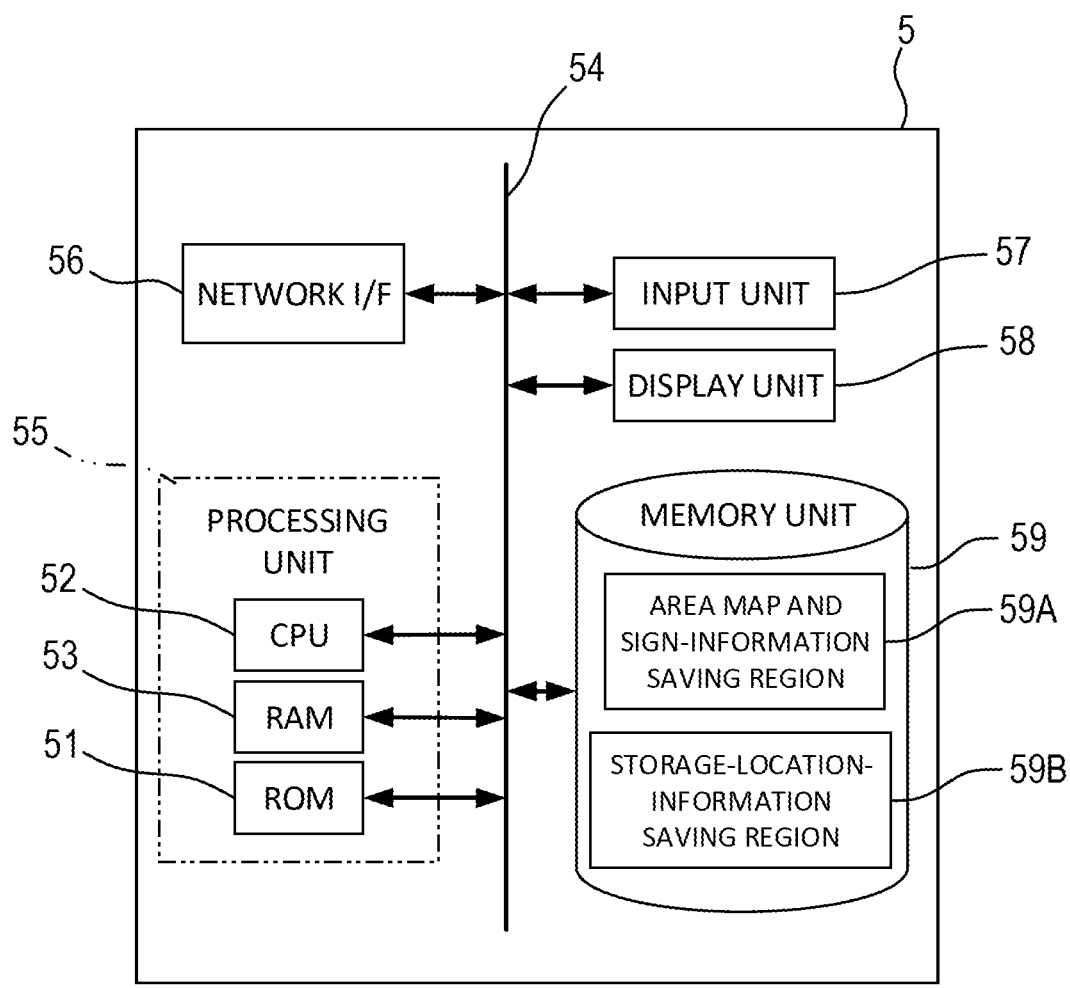
FIG. 4 is a block diagram for explaining a support device in the warehousing/shipping-operation support system according to this embodiment.

Next, the support device 5 will be described. FIG. 4 is a block diagram for explaining the support device 5 in the warehousing/shipping-operation support system 1 according to this embodiment.

The support device 5 includes a ROM 51, a CPU 52 that controls each unit in accordance with various control programs stored in the ROM 51, and a RAM 53 as a work area of the CPU 52. The ROM 51, the CPU 52, the RAM 53, and each component, which will be described later, are connected by an internal bus 54.

The ROM 51, the CPU 52, and the RAM 53 function as a processing unit 55 that executes various processes for supporting the warehousing/shipping operation of the articles. Details of the processes executed by the support device 5 will be described later.

The support device 5 includes a network I/F 56 so as to be connected to the network NW wirelessly.

In addition, the support device 5 has an input unit 57 and a display unit 58. The input unit 57 is a keyboard, a mouse, and so forth, and the support device 5 receives various setting operation and registration operation for designating the target articles to be warehoused/shipped. The information input with the input unit 57 includes information for designating the target articles of the warehousing/shipping operation.

In a case in which the information for identifying the articles is assigned to the article by identification means, such as RFID tag, bar-code, two-dimensional code, and so forth, a reader device for reading the identification means is included as the input unit 57.

In addition, the display unit 58 is, for example, a liquid crystal display (LCD) and displays items required for operation of selecting the target articles of the warehousing/shipping operation, various setting operation required for performing the warehousing/shipping operation, and so forth.

In addition, the support device 5 includes a memory unit 59. The memory unit 59 has, as virtual regions, a map-information saving region 59A and a storage-location-information saving region 59B. As the memory unit 59, HDD, SSD, and so forth can be used. The map-information saving region 59A and the storage-location-information saving region 59B may be prepared as an independent memory unit.

Figure 5:
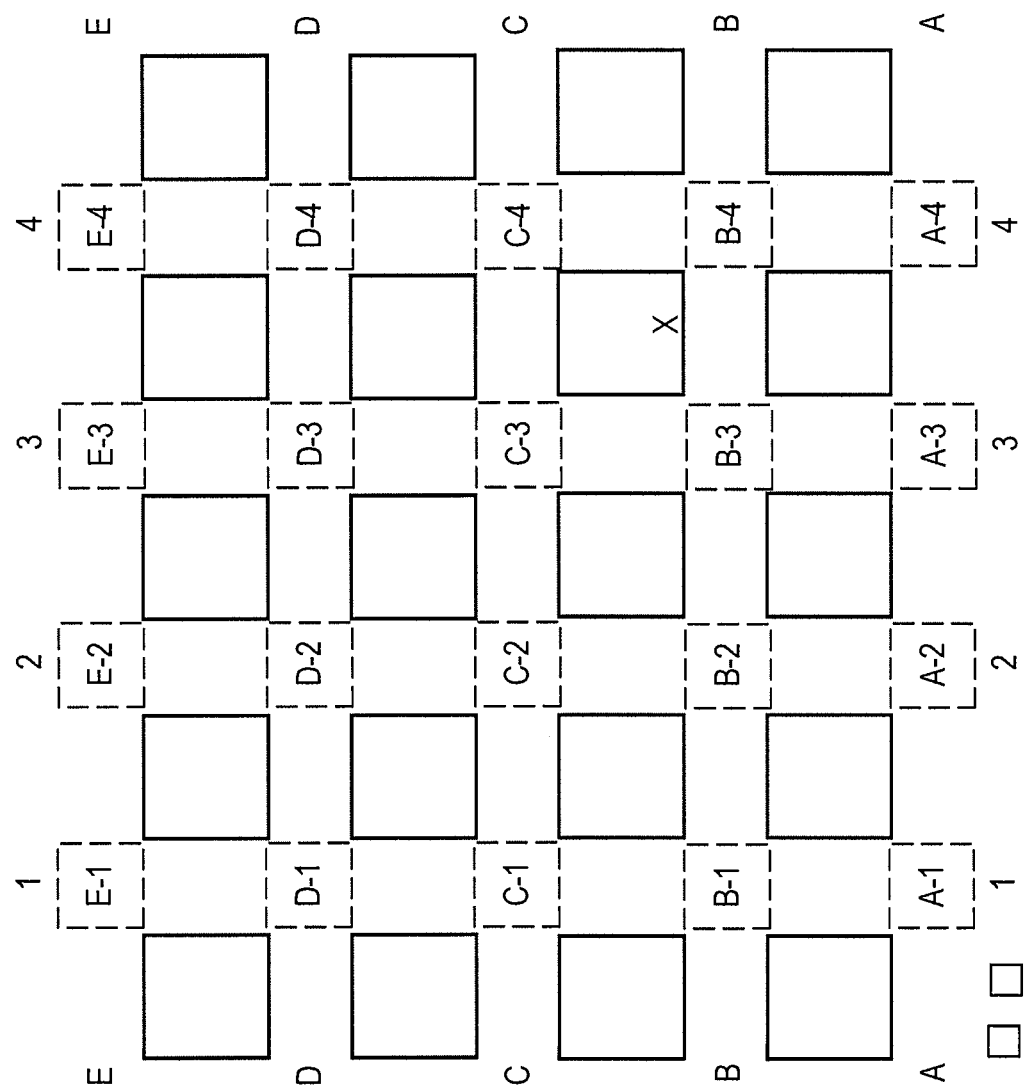
FIG. 5 is a schematic view for explaining a map of whole storage area saved in a map-information saving region in the warehousing/shipping-operation support system according to this embodiment and for explaining signs set in the map.

FIG. 5 is a schematic view for explaining the map of whole storage area 6 saved in the map-information saving region 59A in the warehousing/shipping-operation support system 1 and for explaining the signs M set in the map.

In the map-information saving region 59A, map information of whole storage area 6 and the positional information of the plurality of signs M set in the storage area 6 are saved.

In the map (hereinafter, referred to as an area map) of whole storage area 6, row numbers A to E and column numbers 1 to 4 are respectively assigned to the aisles. Intersection numbers, such as A-1, A-2, and so forth, are defined at intersections at which row aisles and column aisles intersect. The intersection numbers are formed by combining the row numbers and the column numbers. In this embodiment, the intersection numbers are set as the signs M. In addition, the intersection numbers are displayed on the signs M provided in the storage area 6 so as to be visible to the operator W.

In the embodiment, XY coordinate system is associated with the area map of the storage area 6, and the positions of the racks 7, the positions of the signs M, and so forth are expressed by coordinates (X, Y). In other words, in the map-information saving region 59A, the area map of the storage area 6, the coordinates expressing the positions of the racks 7, and the coordinates of the signs M (in this embodiment, intersections) set on the map are saved. In this embodiment, sign information refers to the coordinates of the signs M in the area map.

Figure 6:
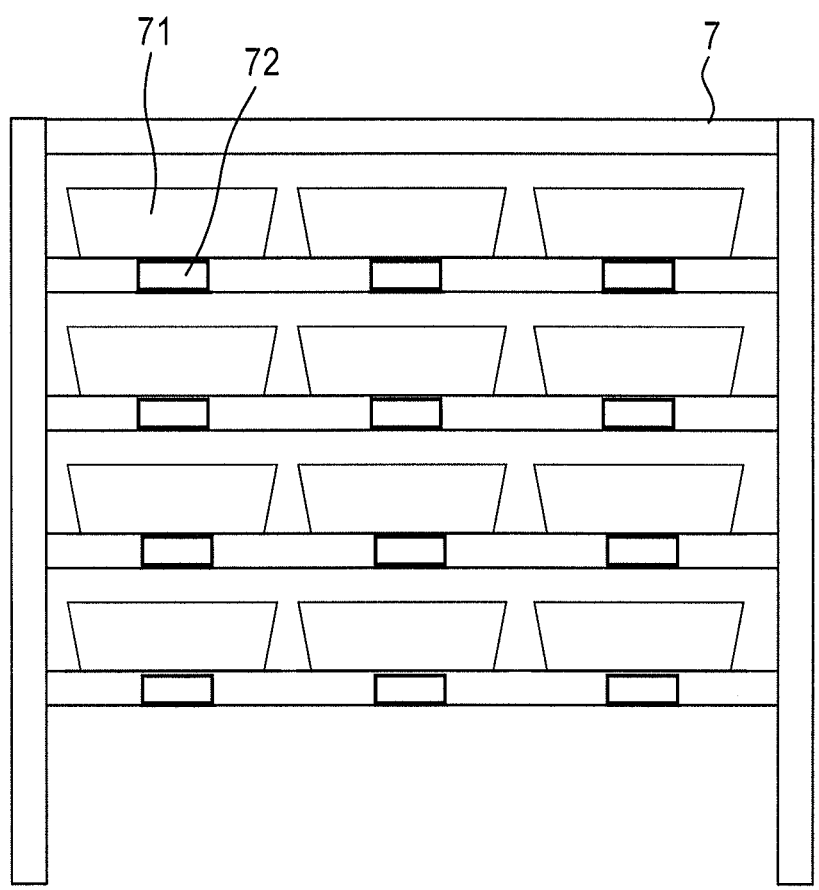
FIG. 6 is a diagram for explaining a rack provided in the storage area and storage locations of articles on the rack.

FIG. 6 is a diagram for explaining the rack 7 provided in the storage area 6 and the storage location of the articles in the racks 7.

FIG. 6 shows a front view of the rack 7. In this embodiment, the rack 7 has four shelf boards, as an example, and a plurality of storage boxes 71 are respectively shelved on the shelf boards. In addition, storage location indicators 72 are provided at corresponding positions to the storage boxes 71. Information indicating locations of the storage boxes 71 (hereinafter, referred to as storage locations) is provided on the storage location indicators 72. The articles are accommodated in the storage boxes 71. The rack 7 has the above-described accommodating spaces on four sides.

The inside of the storage boxes 71 may further be partitioned. In this case, information for specifying each of the partitioned compartments is respectively assigned to the compartments.

FIG. 7 is a diagram for explaining a table saved in the storage-location-information saving region 59B in the warehousing/shipping-operation support system 1.

In the warehousing/shipping-operation support system 1, identifications ID for identifying the articles are assigned to the all articles stored in the storage area 6. Article IDs for identifying the articles and storage-location information indicating the storage locations of the articles in the storage area 6 are saved in the storage-location-information saving region 59B so as to be associated to each other.

An example of the storage-location information can be a combination of identification information of the racks 7, the identification information of the storage boxes 71 shelved on the racks 7, and the article ID accommodated in the storage boxes 71. In FIG. 7, 101-XX-ZZZ, 201-YY-YYY, and so forth are shown as the storage-location information. These storage-location information is assigned to the storage location indicator 72 shown in FIG. 6.

Next, a process for supporting the warehousing/shipping operation of the articles that is executed by the processing unit 55 of the support device 5 will be described.

In the support device 5, based on the storage-location information of the articles and the positional information of the communication terminal 2, the processing unit 55 selects the sign M positioned on the operator W (the communication terminal 2) side among the signs in the vicinity of the storage location of the article from the plurality of signs M. In addition, the processing unit 55 executes a process of transmitting the positional information of the selected sign M to the communication terminal 2.

Here, the positional information of the communication terminal 2 can be obtained from the communication-instrument detection devices 4.

In addition, at the time of the warehousing/shipping operation of the plurality of articles, the processing unit 55 selects, for a first article, the sign positioned on the operator W (the communication terminal 2) side among the signs in the vicinity of the storage location of the first article by using the positional information of the communication terminal 2 acquired by the communication-instrument detection devices 4.

In addition, the processing unit 55 selects, for a second and following articles, the sign positioned on the operator W (the communication terminal 2) side among the signs in the vicinity of the storage location of the next article by using the storage-location information of the immediately preceding article that has been warehoused or shipped as the positional information of the communication terminal 2.

In addition, the processing unit 55 calculates the path from the positional information of the communication terminal 2 to the selected sign M. In particular, this path is the shortest path from the communication terminal 2 to the signs M.

In addition, the processing unit 55 calculates the direction of the storage location of the article from the selected sign M. The processing unit transmits these calculated shortest paths or directions to the communication terminal 2. The direction calculated in this case is the direction of the storage location of the article from the intersection in a state in which the operator W moves through the shortest path from the present position to the intersection as the sign and the operator W faces the intersection before reaching the intersection.

In addition, the processing unit 55 generates a list of the target articles that have been assigned to be warehoused/shipped in addition to execution of the process of selecting the signs M. At this time, the processing unit 55 generates the article list in such an order that optimal paths can be achieved on the basis of the storage-location information of the articles.

With the warehousing/shipping-operation support system 1 according to this embodiment, by having the above-mentioned configuration, it is possible to support the warehousing/shipping operation of the articles by the operator W.

[Warehousing/Shipping-Operation Support Method]

Next, a warehousing/shipping-operation support method achieved by the above-described warehousing/shipping-operation support system will be described. The warehousing/shipping-operation support method according to the embodiment of the present invention is the warehousing/shipping-operation support method for supporting the warehousing/shipping operation in which the plurality of articles are warehoused to the storage area or the plurality of articles are shipped from the storage area, and the warehousing/shipping-operation support method has: a positional information acquisition step of acquiring the positional information of the start position of the operator in the warehousing/shipping operation; and a processing step of selecting, based on the storage-location information indicating a storage location of a specific article among a plurality of articles and the positional information of the operator, the map information of the storage area and a sign positioned on the operator side among the signs in the vicinity of the storage location of the article from the plurality of signs set in the storage area.

According to the warehousing/shipping-operation support method, in the processing step, for the first article in the warehousing/shipping operation, by using the positional information of the operator acquired by the positional information acquisition unit, a sign positioned on the operator side is selected among the signs in the vicinity of the storage location of the first article. In addition, for the next article in the warehousing/shipping operation, by using the storage-location information of the preceding article as the positional information of the operator, the sign positioned on the operator side is selected among the signs in the vicinity of the storage location of the next article.

<Warehousing/Shipping-Operation Support Process in Support Device>

Figure 8:
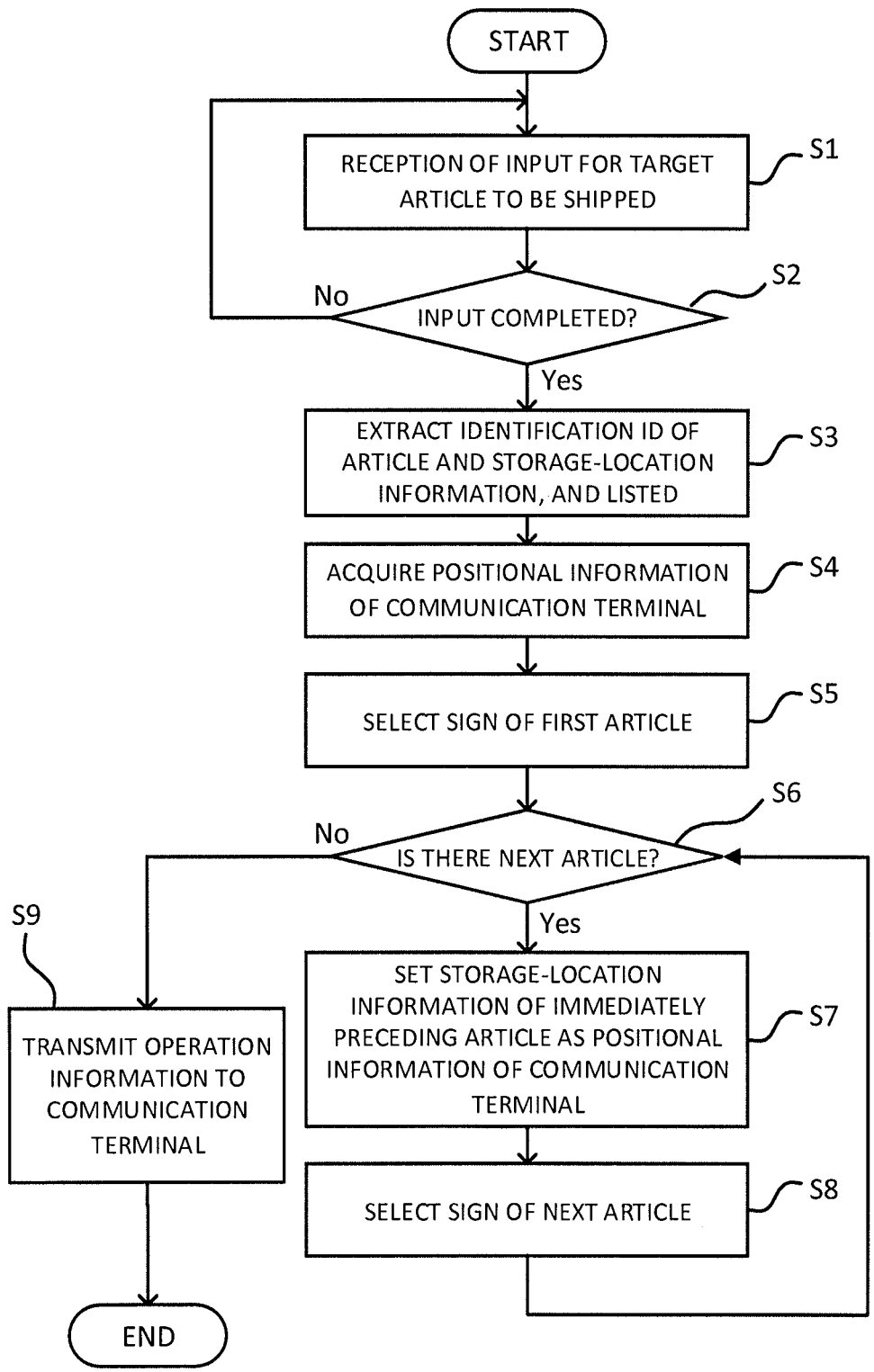
FIG. 8 is a flowchart for explaining a process executed by a processing unit of the support device in the warehousing/shipping-operation support system.

FIG. 8 is a flowchart for explaining a series of processes for the warehousing/shipping-operation support method executed by the processing unit 55 of the support device 5. Here, a case in which the articles are warehoused is explained.

In Step S1, the processing unit 55 receives inputs from the input unit 57 for designating the target articles to be shipped in a shipping-list generation mode.

When the input of the target articles to be shipped is completed in Step S2, in Step S3, the processing unit 55 extracts from the storage-location-information saving region 59B the identification IDs and the storage-location information of the target articles to be shipped that have been input by the input unit 57 and generates a list thereof. At this time, the processing unit 55 generates the list on the basis of the storage-location information of the articles such that the paths are optimized.

In Step S4, the processing unit 55 acquires the positional information of the communication terminal 2.

Next, in Step S5, on the basis of the positional information of the communication terminal 2, the sign M positioned on the operator W (the communication terminal 2) side is selected among the signs in the vicinity of the storage location of the first article from the plurality of signs M.

In addition, the processing unit 55 calculates the shortest path from the positional information of the communication terminal 2 to the selected sign M. Furthermore, the processing unit 55 also calculates the direction of the storage location of the article from the selected sign M.

In Step S6, it is determined whether there is a next article on the list of the target articles to be shipped, and if it is determined that there is the next article, in Step S7, the storage-location information of the immediately preceding article is set as a present positional information of the communication terminal 2.

Next, in Step S8, by using the storage-location information of the immediately preceding article as the present positional information of the communication terminal 2, the sign M positioned on the operator W side is selected among the signs in the vicinity of the next article from the plurality of signs M.

In addition, the processing unit 55 calculates the shortest path to the selected sign M. Furthermore, the processing unit 55 also calculates the direction of the storage location of the article from the selected sign M.

If it is determined that the selection of the signs are finished for all of the target articles to be shipped in Step S6, in Step S9, the processing unit 55 transmits the positional information of the selected signs (hereinafter, referred to as the sign information), the paths to the selected signs, the directions from the signs, and so forth to the communication terminal as the operation information for the articles.

FIG. 9 is a diagram for explaining the operation information, such as the signs selected by the processing unit 55, the shortest paths to the selected signs, the directions from the sign, and so forth.

FIG. 9 shows that a set of four hangers, a storage box L, a spatula, a set of thirty trash bags (L size), and a printer ink (blue) are selected as the target articles to be shipped. In addition, the article IDs of the target articles to be shipped, the storage-location information, the positional information of the operator W, the signs are also shown. In addition, the directions from the signs are also shown as an additional information.

Among the information contained in the table shown in FIG. 9, the processing unit 55 transmits at least article name, the article ID, and the sign M to the communication terminal 2.

In addition, although not shown in FIG. 9, the information indicating the shortest path to the sign from the positional information of the communication terminal 2 is also contained.

<Explanation of Functional Operation of Warehousing/Shipping-Operation Support System>

Figure 10:
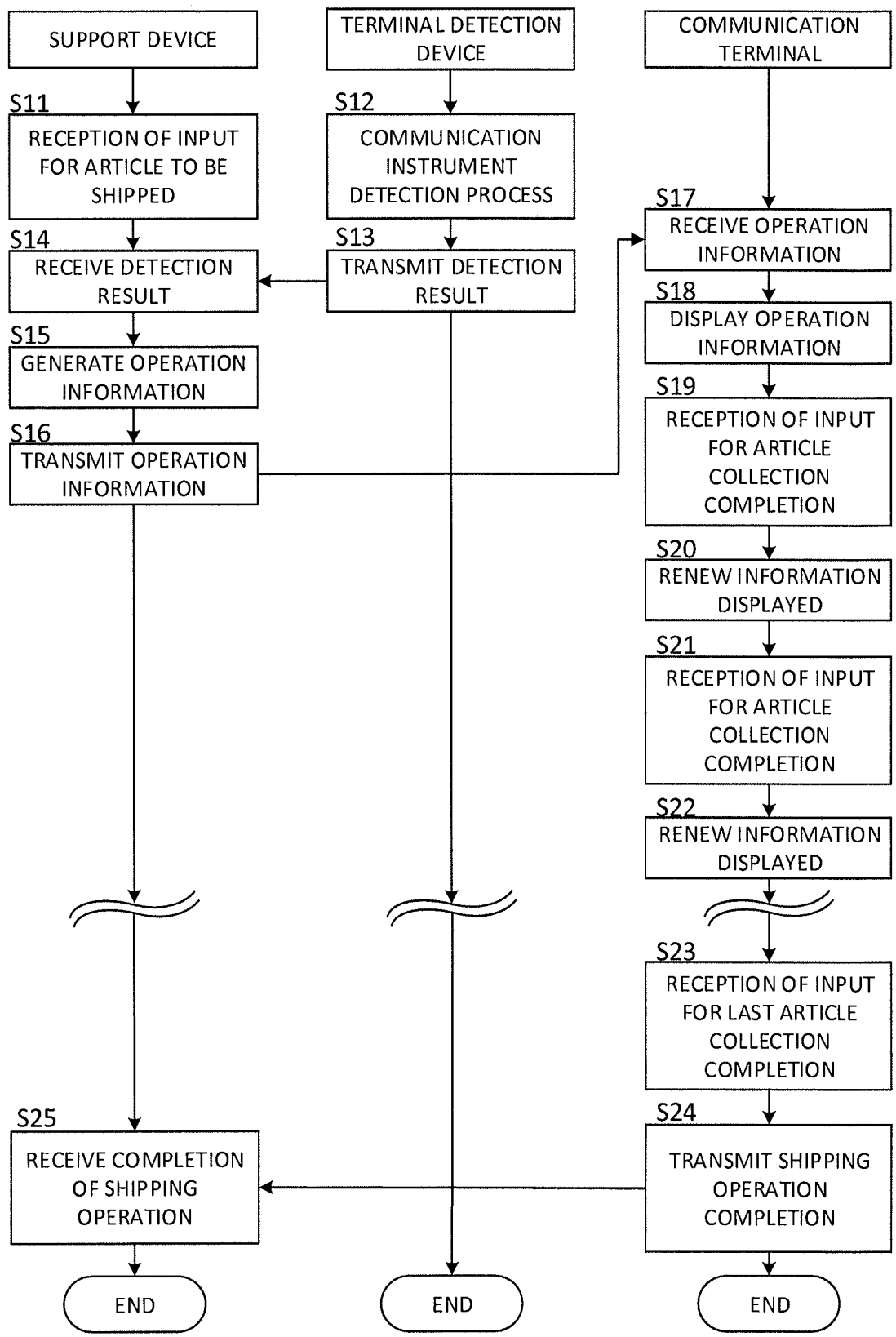
FIG. 10 is a timing chart for explaining functional operations of the communication terminal, of the communication-instrument detection device, and of the support device in the warehousing/shipping-operation support system.

Next, a functional operation of the warehousing/shipping-operation support system 1 will be described. FIG. 10 is a timing chart for explaining the functional operations of the communication terminal 2, the communication-instrument detection devices 4, and the support device 5 in the warehousing/shipping-operation support system 1 according to this embodiment.

In Step S11, the support device 5 receives the input for designating the target articles to be shipped from the input unit 57, extracts from the storage-location-information saving region 59B the identification IDs and the storage-location information of the target articles to be shipped, and generates a shipping operation list (these correspond to Steps S1 to S3 in the processing unit 55).

On the other hand, in Step S12, the communication-instrument detection devices 4 execute the process to detect the communication instrument 3, and if it is determined that the communication instrument 3 is detected, in Step S13, the positional information of the communication instrument 3

(in other words, the positional information of the operator W and the communication terminal 2) is transmitted to the support device 5.

In Step S14, the support device 5 receives the positional information of the operator W and the communication terminal 2, and in Step S15, the support device 5 selects, on the basis of the received positional information of the communication terminal 2, the sign M positioned on the operator W (the communication terminal 2) side among the signs in the vicinity of the storage location of the first article from the plurality of signs M. In addition, the support device 5 generates the operation information such as the shortest path from the positional information of the communication terminal 2 to the selected sign M, the direction of the storage location of the article from the selected sign M, and so forth. In addition, the operation information is similarly generated for all of the articles contained in the list of the target articles to be shipped (these correspond to Steps S4 to S8 in the processing unit 55).

In Step S16, the support device 5 transmits the operation information to the communication terminal 2.

In Step S17, the communication terminal 2 receives the operation information.

In Step S18, the communication terminal 2 displays the operation information of the target articles to be shipped on the display unit 26.

In Step S19, the input indicating that collection of the article listed in the shipping operation list by the operator W has been completed is received.

Upon obtaining the input indicating the completion of the collection of the article in Step S19, in Step S20, the communication terminal 2 renews the information displayed on the display unit 26 by, for example, deleting the sign and the path of the article whose collection has been completed.

Next, in Step S21, the input indicating that the collection of the article listed in the shipping operation list has been completed by the operator W is received. In Step S21, when the input indicating the completion of the collection of the article is received, the communication terminal 2 renews the information to be displayed in Step S22.

When the input indicating the completion of the collection of all articles on the list is made in Step S23, in Step S24, the communication terminal 2 transmits a notification notifying the completion of the shipping operation to the support device 5.

In Step S25, the shipping operation of the articles is finished when the support device 5 receives the notification notifying the completion of the shipping operation.

Figure 11:
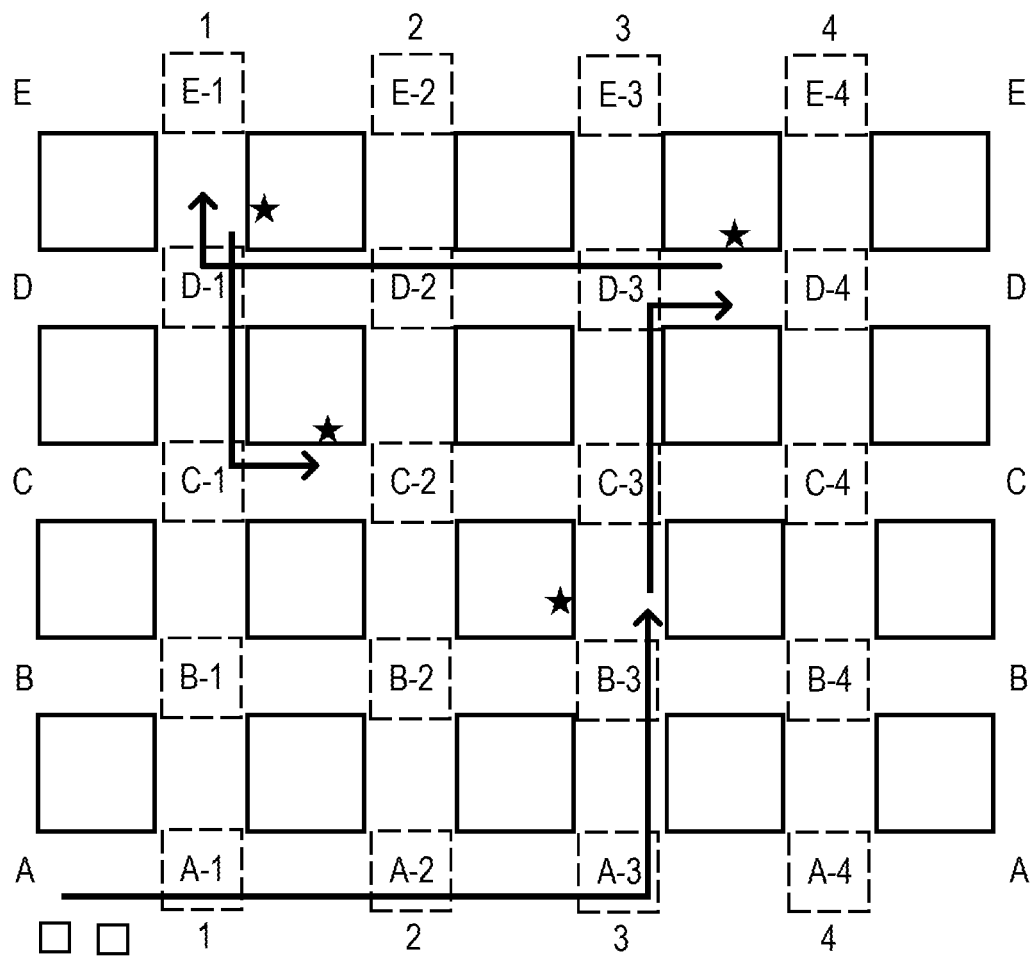
FIG. 11 is a diagram for explaining a display example of the operation information displayed on a display unit of the communication terminal in the warehousing/shipping-operation support system.

FIG. 11 is a diagram for explaining a display example of the operation information displayed on the display unit 26 of the communication terminal 2. According to the functional operation shown in FIG. 10, as shown in FIG. 11, the display unit 26 of the communication terminal 2 displays, for the target articles to be shipped, the operation information, such as the nearest sign from the article, the shortest path to the sign, and so forth.

In other words, the display unit 26 of the communication terminal 2 shows the sign and the direction from the sign like "B-3 and Go Forward", "D-3 and Right", "D-1 and Right", and "C-1 and Left".

Therefore, by allowing the operator W to perform the operation by following the operation information displayed on the display unit 26, it is possible to achieve improvement in efficiency of the warehousing/shipping operation without relying on the experience of the operator W.

In addition, with the warehousing/shipping-operation support system 1, it suffices that the positional information of the start position of the operator (the communication terminal 2) in the warehousing/shipping operation can be acquired. Therefore, it is possible to simplify the configuration for acquiring the positional information of the communication terminal 2.

Therefore, according to the warehousing/shipping-operation support system 1, as described above, it is possible to achieve improvement in the efficiency of the warehousing/shipping operation performed by the operator W, and at the same time, it is possible to reduce system load by preventing wireless communication environment from becoming complex.

Figure 12:
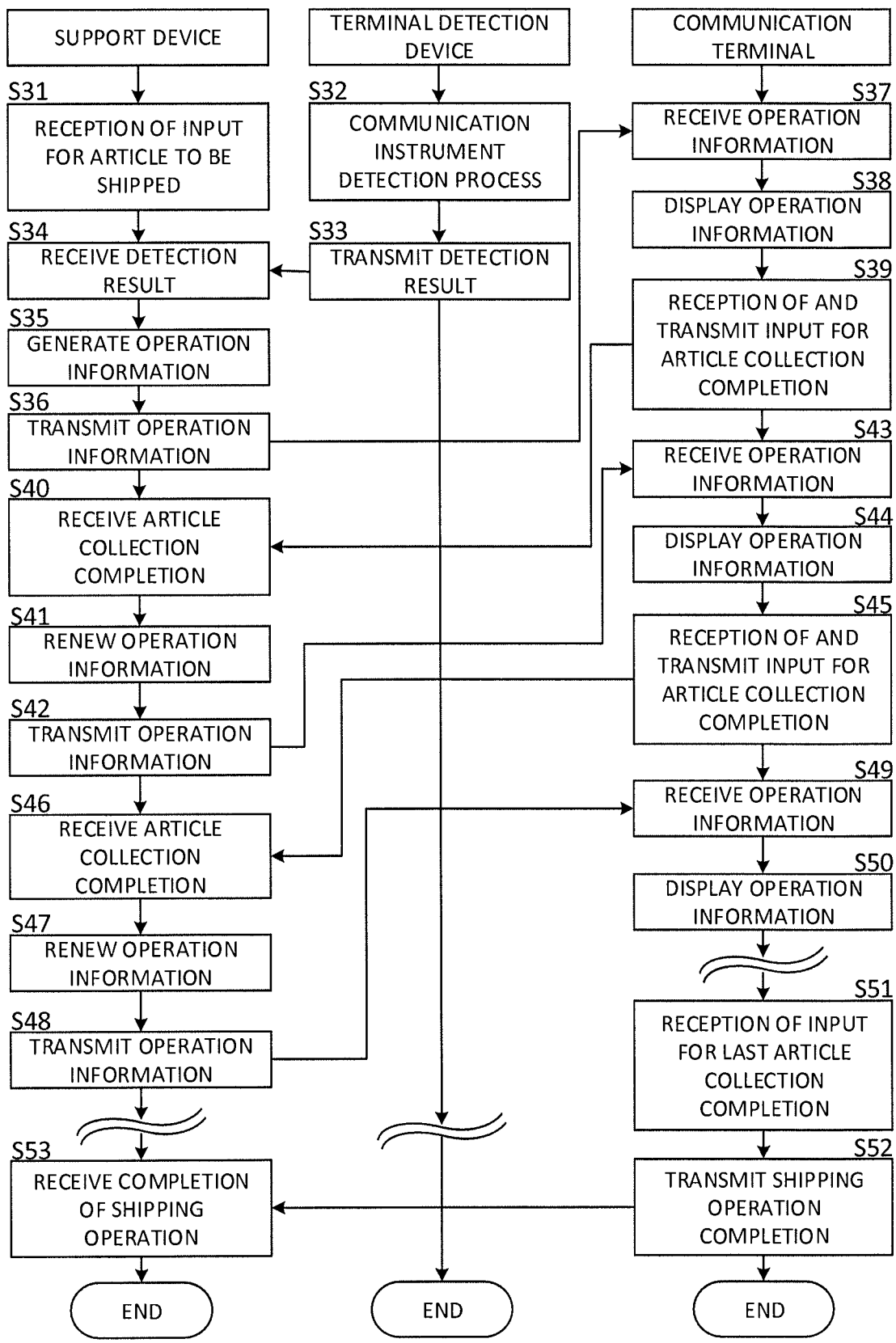
FIG. 12 is a timing chart for explaining other functional operations of the communication terminal, of the communication-instrument detection device, and of the support device in the warehousing/shipping-operation support system according to this embodiment.

Next, another functional operation of the warehousing/shipping-operation support system 1 will be described. FIG. 12 is a timing chart for explaining another functional operation of the communication terminal 2, the communication-instrument detection devices 4, and the support device 5 in the warehousing/shipping-operation support system 1 according to this embodiment.

The functional operation shown in FIG. 12 is performed in a manner in which the sign of the next article is selected every time the articles on the list of the target articles to be shipped are collected on the basis of the positional information of the operator W (the communication terminal 2) at that time.

Steps S31 to S33 correspond to the above-mentioned Steps S11 to S13. In Step S34, the support device 5 receives the positional information of the operator W and the communication terminal 2, and in Step S35, on the basis of the positional information of the communication terminal 2 thus received, the support device 5 selects the signs M on the operator W (the communication terminal 2) side among the signs in the vicinity of the storage location of the first article from the plurality of signs M. In addition, the support device 5 generates, for the first article, the operation information such as the shortest path from the positional information of the communication terminal 2 to the selected sign M, the direction of the storage location of the article from the selected sign M, and so forth.

In Step S36, the support device 5 transmits the operation information for the first article to the communication terminal 2.

In Step S37, the communication terminal 2 receives the operation information for the first article.

In Step S38, the communication terminal 2 displays the operation information, such as the nearest sign from the first article that is the target to be shipped, etc., on the display unit 26 on the basis of the operation information.

In Step S39, the communication terminal 2 receives the input indicating that the collection of the article listed in the shipping operation list has been completed by the operator W, and the completion of the collection of the article is transmitted to the support device 5.

When the support device 5 receives the input indicating the completion of the collection of the article in Step S40, in Step S41, the support device 5 selects, by using the storage-location information of the articles whose collection has been completed as the present positional information of the operator W (the communication terminal 2), the sign M positioned on the operator W (the communication terminal 2) side among the signs in the vicinity of the storage location of the next article. In addition, for this article, the support device 5 generates the operation information such as the shortest path to the selected sign M, the direction of the storage location of the article from the selected sign M, and so forth.

In Step S42, the support device 5 transmits the operation information for the next article to the communication terminal 2.

In Step S43, the communication terminal 2 receives the operation information for the next article.

Similarly to Step S38, in Step S44, the communication terminal 2 displays the operation information of the nearest sign from the target articles to be shipped, etc. on the display unit 26.

When the input indicating the completion of the collection of the article by the operator W is received in Step S45, the completion of the collection of the article is transmitted to the support device 5.

In Steps S46 to S48, the processes similar to those in Steps S40 to S42 are executed by the support device 5, and the operation information is transmitted to the communication terminal 2.

The processes similar to those of Steps S43 to S45 are performed with the communication terminal 2. In Step S51, the communication terminal 2 receives the input indicating the completion of the collection of the last article on the list, and thereafter, in Step S52, the communication terminal 2 transmits the notification notifying the completion of the shipping operation to the support device 5.

When the support device 5 receives the notification notifying the completion of the shipping operation in Step S53, the shipping operation of the articles is finished.

According to the functional operation shown in FIG. 12, the display unit 26 of the communication terminal 2 displays the operation information such as the nearest sign, etc. for every article to be shipped. Therefore, the operator W can perform the warehousing/shipping operation reliably without causing confusion with the operation information displayed on the display unit 26. In addition, it is possible to achieve the improvement in efficiency of the warehousing/shipping operation without relying on the experience of the operator W.

In addition, with the warehousing/shipping-operation support system 1, it suffices to obtain the positional information of the start position of the communication terminal 2 in the warehousing/shipping operation. Therefore, it is possible to simplify the configuration for acquiring the positional information of the communication terminal 2.

Therefore, according to the warehousing/shipping-operation support system 1, as described above, it is possible to achieve improvement in the efficiency of the warehousing/shipping operation performed by the operator W, and at the same time, it is possible to reduce system load by preventing wireless communication environment from becoming complex.

[Warehousing/Shipping-Operation Support Program]

The series of processes in the above-mentioned warehousing/shipping-operation support method may be provided as a warehousing/shipping-operation support program that causes a computer to execute the warehousing/shipping-operation support method.

In other words, the warehousing/shipping-operation support program according to the embodiment causes the computer to execute: a step of acquiring the positional information of the start position of the operator in the warehousing/shipping operation; and a step of executing a process of selecting, based on the storage-location information indicating a storage location of a specific article among the plurality of articles and the positional information of the operator, the map information of the storage area and the sign positioned on the operator side among the signs in the vicinity of the storage location of the article from the plurality of signs set in the storage area.

In addition, the warehousing/shipping-operation support program causes the computer to execute: a step of selecting, for the first article in the warehousing/shipping operation, the sign positioned on the operator side among the signs in the vicinity of the storage location of the first article by using the positional information of the operator acquired by the positional information acquisition unit; and a step of performing a process of selecting, for the next article in the warehousing/shipping operation, by using the storage-location information of the preceding article as the positional information of the operator, the sign positioned on the operator side among the signs in the vicinity of the storage location of the next article. The computer is configured to function as a warehousing/shipping-operation support device that supports the warehousing/shipping operation in which the plurality of articles are shipped to the storage area or the plurality of articles are shipped from the storage area.

The program for executing the above-mentioned series of processes is provided in the form of a computer readable memory medium. In the support device 5, the program may be stored in the memory unit 59.

OTHER EMBODIMENTS

In the warehousing/shipping-operation support system 1, when more than one access gate can be provided in the storage area 6 for entry of the operator W, a plurality of communication-instrument detection devices 4 may be installed for every access gate. With such a configuration, the support device 5 can specify the position of the operator W about to start the warehousing/shipping operation in the plurality of access gates for the storage area 6.

With such a configuration, the support device 5 can select a suitable sign to be used for the operator W to reach the target article to be warehoused/shipped.

It is possible to improve accuracy of the positional information of the communication terminal 2 by increasing the number of the communication-instrument detection devices 4. However, it is preferable to use the minimum number of communication-instrument detection devices 4 in consideration of the spirit of the present invention of avoiding the wireless communication environment from becoming complex and reducing the system load.

Thus, in the warehousing/shipping-operation support system 1, single communication-instrument detection device 4 may be installed for every access gate. With such a configuration, when the communication terminal 2 enters within a communication zone of UWB, the positional information set to the communication-instrument detection devices 4 themselves in the storage area 6 is transmitted to the support device 5 as the positional information of the communication terminal 2.

In addition, in this embodiment, it suffices to obtain the positional information of the communication terminal 2 at the time of starting the warehousing/shipping operation. In view of preventing the wireless communication environment from becoming complex and reducing the system load, it is preferable that the mode of detecting the positional information of the communication terminal 2 at the time of starting the warehousing/shipping operation be simple.

Thus, with the warehousing/shipping-operation support system 1, other means than the communication by the UWB mode may be used as means for detecting the positional information of the communication terminal 2 in the storage area 6. An example includes a mode in which an identification code, such as a RFID tag, a bar-code, a two-dimensional code, and so forth, is attached to the communication terminal 2 carried by the operator W, and the identification code is read in a predetermined position of the storage area 6.

In this case, the reader device assigned with the installation positional information in the map and the identification ID is provided at the access gate for the storage area 6. At the time of starting the warehousing/shipping operation, the operator W uses the reader device to read the identification code. The reader device sends the read identification code together with its identification ID to the support device 5.

With such a configuration, the support device 5 can acquire the positional information of the identification code read by the reader device and the positional information of the reader device, and the support device 5 can specify the position of the operator W in the map including the storage area 6.

In addition, apart from the mode in which the identification code, such as the RFID tag, the bar-code, the two-dimensional code, and so forth, is read, a communication in a BLE (Bluetooth Low Energy) mode can also be applied.

The storage-location information, such as 101-XX-ZZZ, 201-YY-YYY, and so forth, shown in FIG. 7 may be prepared as the identification means, such as the RFID tag, the bar-code, the two-dimensional code, and so forth. Furthermore, the identification ID for identifying the articles may be attached to the articles as the identification means, such as the RFID tag, the bar-code, the two-dimensional code, and so forth.

In this case, the reader device capable of reading the identification means assigned to the article and the identification means assigned to the storage location indicator 72 is connected to the communication terminal 2.

By using the reader device, the operator W reads the identification means assigned to the article and the identification means assigned to the storage location indicator 72. With such a configuration, it is possible to simplify the operation for inputting the completion of the warehousing/shipping of the articles.

In the warehousing/shipping-operation support system 1, the sign M may be a display device, such as a liquid-crystal display panel, an electric paper, and so forth, that can change displayed content. With such a configuration, even in a situation in which the number of the racks are increase/decreased or the layout is changed in the storage area 6, it is possible to cope with such a situation easily.

Apart from the tablet computer, for example, a smart phone, a head mount display terminal, and so forth may be used as the communication terminal 2.

In this embodiment, in the warehousing/shipping-operation support system 1, the operator W is notified of which direction the operator W needs to move from the sign in order to reach the target article. With this notification method, for example, when the operator W is moving in the column aisle 3 in FIG. 5 from the bottom to the top on the plane of FIG. 5, the information for guiding the operator W to a storage location X is "Turn right at intersection B-3".

On the other hand, when the same storage location X is to be designated, when the operator W is moving in the column aisle 3 from the top to the bottom on the plane of FIG. 5, the information for guiding the operator W is "Turn left at intersection B-3".

As described above, because opposite directions are instructed depending on the movement of the operator W, it is conceivable that the operator W is confused.

Thus, as an example, an unique direction name may be defined in the storage area 6. In a sub-embodiment, the direction name includes, for example, "go upward/go downward", "ocean side/mountain side", "front side/back side", "shipping berth side/back side", and so forth. By defining the direction name as described above, for example, the operation information shown in FIG. 11 can be expressed as follows.

In a case in which the top side of the plane of FIG. 11 is defined as "go upward", the bottom side thereof as "go downward", the right side thereof as "ocean side", and the left side thereof as "mountain side" in the map of the storage area shown in FIG. 11, the sign and the direction from the sign is displayed on the display unit 26 of the communication terminal 2 as "B-3 and go upward", "D-3 and turn to ocean side", "D-1 and go upward", and "C-1 and turn to ocean side".

In addition, In a case in which the top side of the plane of FIG. 11 is defined as "go upward", the bottom side thereof as "go downward", the right side thereof as "berth side", and the left side thereof as "back side" in the map of the storage area shown in FIG. 11, the sign and the direction from the sign is displayed on the display unit 26 of the communication terminal 2 as "B-3 and go upward", "D-3 and turn to berth side", "D-1 and go upward", and "C-1 and turn to berth side".

With such a configuration, for example, in both of a case in which the operator W is moving upward from the bottom side of the place of FIG. 5 in the column aisle 3 in FIG. 5 and a case in which the operator W is moving downward from the top side of the place of FIG. 5 in the column aisle 3 in FIG. 5, it is possible to uniquely designate the direction of the position of the article from the intersection as, for example, "B-3 and go upward", "B-3 and turn to ocean side", "B-3 and turn to berth side", and so forth. With such a configuration, it is possible to avoid the confusion of the operator W and to improve the operation efficiency.

With the warehousing/shipping-operation support system 1, it is possible to allow the operator W to input the storage-location information of the article that is not a warehousing/shipping target displayed on a neighboring rack 7 from the communication terminal 2 at some point during the warehousing/shipping operation.

The warehousing/shipping-operation support system 1 is not a system capable of locating the positional information of the operator W (the communication instrument 3 and the communication terminal 2) in the storage area 6 in real time. However, as described above, by allowing the operator W to input the neighboring storage-location information and to transmit it to the support device 5, it is possible to renew the operation information at the support device 5 by using the transmitted neighboring storage-location information as the present positional information of the operator W (the communication instrument 3 and the communication terminal 2).

With such a configuration, it is possible to make a recovery even when the operator W has lost his/her present position and path to the article, or even when the operator W has deviated from the path at some point during the warehousing/shipping operation, for example.

Although a case in which the article is shipped has been mainly described in the above-mentioned embodiment, a case in which the article is shipped can also be achieved by a similar process. In other words, in a case in which the target article to be shipped is designated, if the target article has already been registered in the storage-location-information saving region 59B, the identification ID and the storage-location information of the target article to be shipped are extracted and a warehousing list is generated by the processing unit 55 of the support device 5.

On the other hand, if the target article to be shipped is a new article that has not been registered in the storage-location-information saving region 59B, the identification ID and the storage-location information of the article are additionally registered, and thereafter, the warehousing list is generated.

The warehousing operation can follow the processes explained using FIG. 8 after the step of generating the list on the basis of the storage-location information of the articles such that the paths are optimized and the step of generating the operation information by the processing unit 55.

Although the embodiments of the present invention have been described in the above, the above-mentioned embodiments merely illustrate a part of application examples of the present invention, and the technical scope of the present invention is not intended to be limited to the specific configurations in the above-mentioned embodiments.

This application claims priority based on Japanese Patent Application No. 2016-177880 filed with the Japan Patent Office on Sep. 12, 2016, the entire contents of which are incorporated into this specification by reference.

The invention claimed is:

1. A warehousing/shipping-operation support system for warehousing a plurality of articles to a storage area and/or retrieving a plurality of articles from the storage area, the system comprising:
   a portable transceiver configured to be carried by an operator;
   at least one transceiver in the storage area configured to detect the location of the portable transceiver;
   a map-information memory configured such that map information of the storage area and positional information of a plurality of signs set in the storage area are stored in the map-information memory;
   a storage-location information memory configured such that storage-location information indicating a storage location of articles in the storage area is stored in the storage-location information memory; and
   a processor configured to select, based on storage-location information of a specific article among the plurality of articles and positional information of the operator, a sign positioned on an operator side among signs in a vicinity of a storage location of the specific article from the plurality of signs, wherein
   the processor generates a list of target articles for warehousing and/or retrieving and a list of the storage locations of the target articles based on storage-location information from the storage-location information memory;
   the processor selects, for a first article at a time of a warehousing/retrieving operation, a sign positioned on an operator side among signs in a vicinity of a storage location of the first article by using as positional information of the operator the location of the portable transceiver detected by the at least one transceiver, and
   the processor selects, for a second article at the time of the warehousing/retrieving operation, a sign positioned on an operator side among signs in a vicinity of a storage location of the second article by using storage location information of the first article from the list of the storage locations of the target articles as the positional information of the operator, without detecting the portable transceiver.

2. The warehousing/shipping-operation support system according to claim 1, wherein the processor is configured to calculate a shortest path from the positional information of the operator to the selected sign and to present the shortest path.

3. The warehousing/shipping-operation support system according to claim 2, wherein
   the processor is configured to, in a state in which the operator moves through the shortest path and faces the sign before reaching the sign, calculate a direction of the storage location of the article from the sign and to present the direction.

4. The warehousing/shipping-operation support system according to claim 1, wherein
   a plurality of operation aisles are formed so as to intersect with each other in the storage area, and the intersection is set as the sign, the operation aisles being configured to allow movement of the operator.

5. The warehousing/shipping-operation support system according to claim 4, wherein
   the operation aisles are formed as a grid shape.

6. The warehousing/shipping-operation support system according to claim 5, wherein
   a unique direction name is defined in the storage area, and the processor presents a direction from the sign based on the direction name.

7. The warehousing/shipping-operation support system according to claim 1, further comprising
   an operator communication terminal, wherein
   operation information including the sign is presented on the operator communication terminal, the sign being positioned on the operator side among the signs in a vicinity of the storage location of the article and being selected by the processor.

8. A warehousing/shipping-operation support method for supporting a warehousing/retrieving operation in which a plurality of articles are warehoused to a storage area and/or a plurality of articles are retrieved from the storage area, the warehousing/shipping-operation support method comprising:
   a positional information acquisition step of acquiring positional information of an operator in the warehousing/retrieving operation; and
   a processing step of selecting, based on storage-location information indicating a storage location of a specific article among the plurality of articles and based on the positional information of the operator, map information of the storage area and a sign, wherein
   in the processing step, for a first article in the warehousing/retrieving operation, a sign is selected by using as positional information of the operator the location of a portable transceiver carried by the operator that is detected by at least one transceiver, and
   for a second article in the warehousing/retrieving operation, a sign is selected by using storage-location information of the first article from a list of the storage locations of target articles as the positional information of the operator, without detecting the portable transceiver.

9. The warehousing/shipping-operation support system according to claim 1, wherein the list of target articles generated by the processor includes positional information of selected signs that is transmitted to the operator.

10. The warehousing/shipping-operation support system according to claim 1, wherein the list of target articles generated by the processor includes (1) positional information of a selected sign and (2) direction from the selected sign to a next target article that are transmitted to the operator.

11. The warehousing/shipping-operation support system according to claim 1, wherein the signs correspond to aisle intersections.

12. The warehousing/shipping-operation support system according to claim 1, wherein the processor is configured to
- receive an indication of completion of warehousing/retrieving of an article, and
- select, for a next article, a sign using the storage location of said article whose warehousing/retrieving has been completed as present positional information of the operator.

13. The warehousing/shipping-operation support system according to claim 1, wherein
- the storage area comprises a plurality of access points and a transceiver at each access point configured to detect the portable transceiver,
- the processor selects, for the first article at a time of a warehousing/retrieving operation, a sign using as positional information of the operator the location of an access point whose transceiver has detected the portable transceiver.

14. The warehousing/shipping-operation support system according to claim 13, wherein the processor selects, for articles after the first article, signs using only storage location information of a preceding article from the list of the storage locations of the target articles as the positional information of the operator.

* * * * *